H. CHI.
APPARATUS FOR WRITING CHINESE.
APPLICATION FILED APR. 17, 1915.
1,260,753.
Patented Mar. 26, 1918.
3 SHEETS—SHEET 3.
FIG. 4.    FIG. 5.
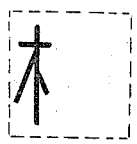     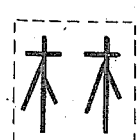
FIG. 6.
| 1 | 2 | 3 | 4 | 5 | 6 |
|---|---|---|---|---|---|
| 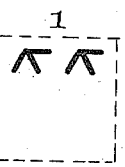 | 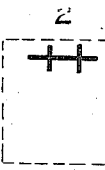 | 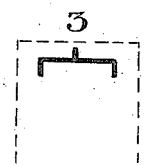 |  | 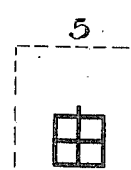 | 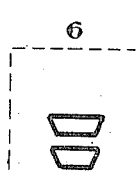 |
FIG. 7.
| 1+4 | 2+4 | 3+4 | 1+5 | 2+5 | 3+5 |
|---|---|---|---|---|---|
|  |  | 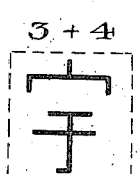 | 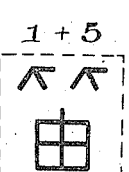 | 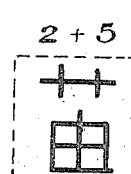 | 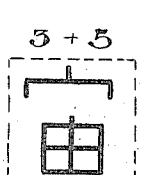 |
| 1+6 | 2+6 | 3+6 |
|---|---|---|
|  | 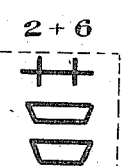 |  |
Inventor
Heuen Chi,
By J.R. Nottingham
Attorney
Witnesses
Chas. L. Griesbauer
Frank L. Bruriton

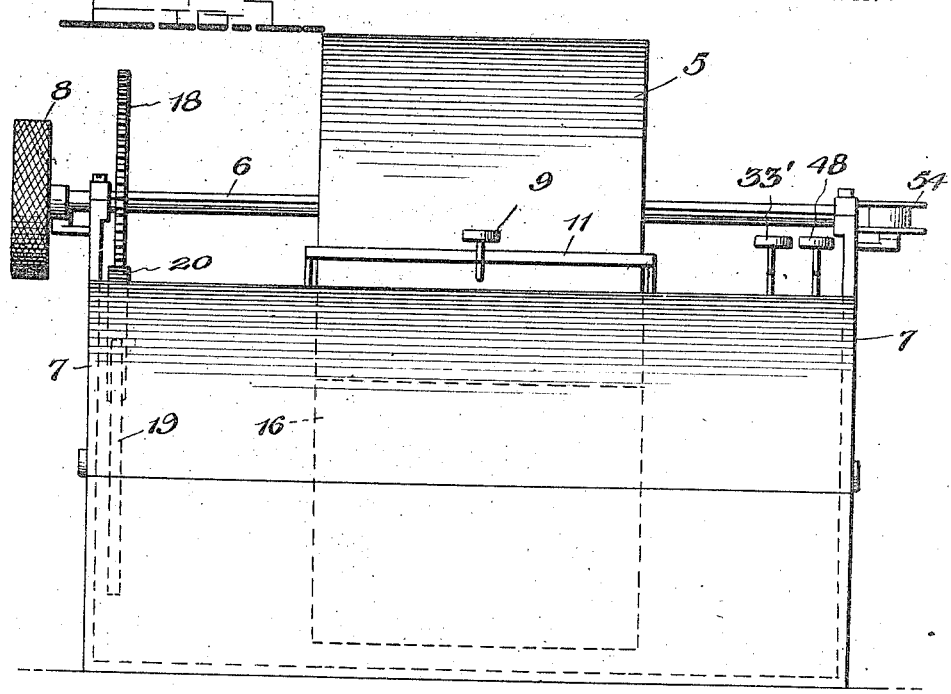
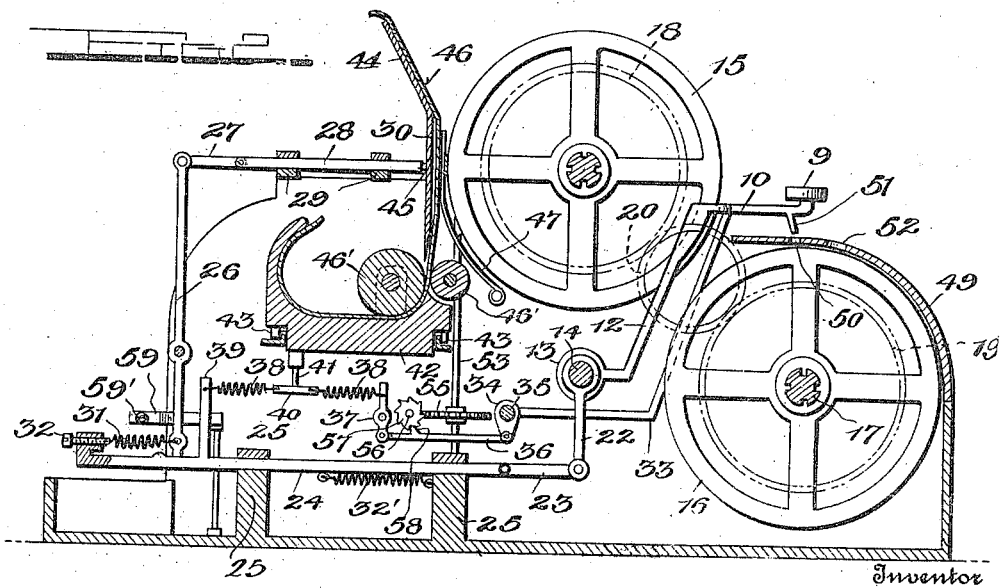

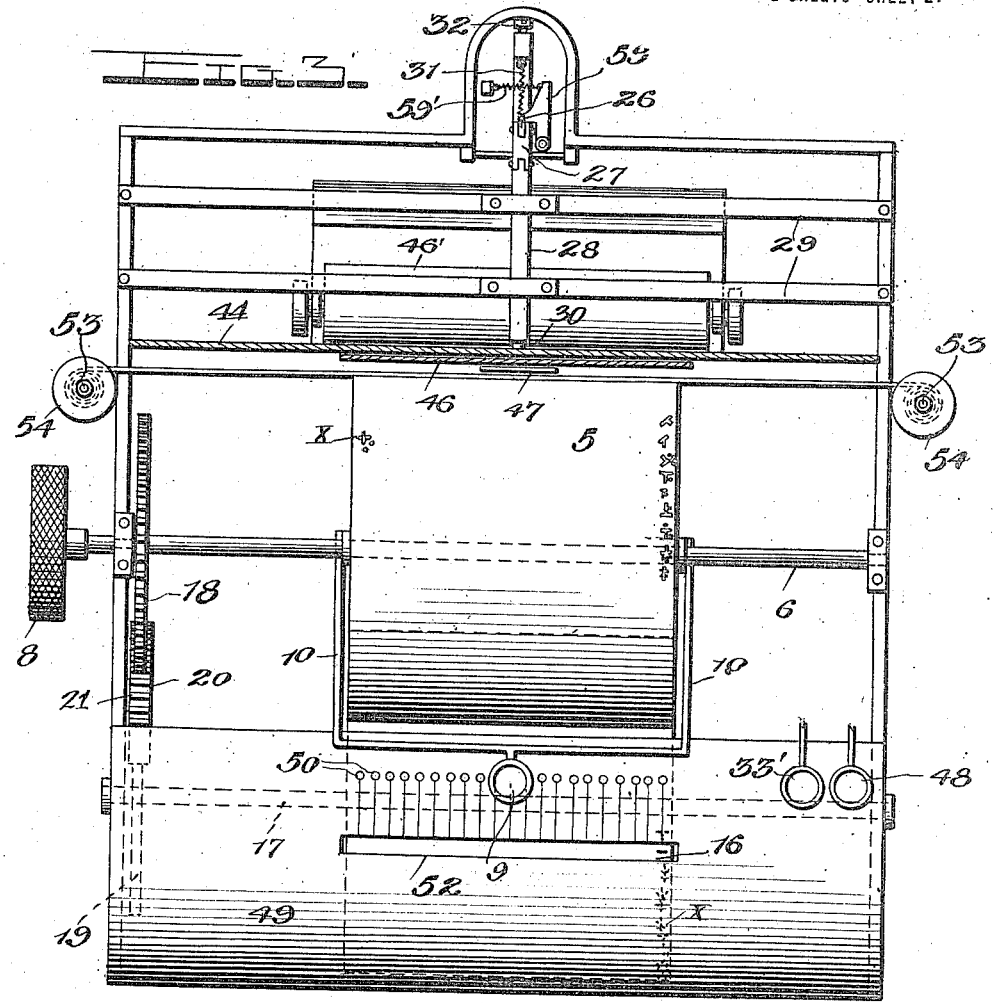

UNITED STATES PATENT OFFICE.

HEUEN CHI, OF NEW YORK, N. Y., ASSIGNOR TO THE REPUBLIC OF CHINA.

APPARATUS FOR WRITING CHINESE.

1,260,753.  Specification of Letters Patent.  Patented Mar. 26, 1918.

Application filed April 17, 1915. Serial No. 22,021.

*To all whom it may concern:*

Be it known that I, HEUEN CHI, a citizen of the Republic of China, residing at New York, in the county of New York and State of New York, have invented certain new and useful Improvements in Apparatus for Writing Chinese, of which the following is a specification.

My invention relates to a system of arranging and separating certain Chinese characters into new and novel radicals, and combining said radicals so as to form various words, and to a machine capable of carrying out not only the system devised by me, but also the separation and combination of the radicals forming the Chinese characters now in use.

The radicals which I have devised number 1327, but by including in different directions—right or left, up or down—they will number 1720, and can be arranged to form thousands of words, for example, take the four radicals indicated by the numerals 1, 2, 3, and 4 and applying to each numeral a letter of the English alphabet, (there being no Chinese alphabet), for instance, *a* representing the numeral 1; *b* the numeral 2; *c* the numeral 3, and *d* the numeral 4, they can be so arranged and combined as to form seven words or sentences, as follows:

*a* and *b* (1 and 2) combined, forms—stopping,

*a* and *c* (1 and 3) combined, forms—an old man,

*a* and *d* (1 and 4) combined, forms—a kind of star,

*b* and *b* (2 and 2) combined, forms—forest,

*b* and *c* (2 and 3) combined, forms—pine tree,

*b* and *d* (2 and 4) combined, forms—one of the seven stars,

*c* and *d* (3 and 4) combined, forms—brightness.

By adding one or two more radicals twenty or more words can be formed.

In practising my invention I may use the writing or printing machine illustrated in the accompanying drawing, in which—Figure 1 is a front view; Fig. 2, a central, transverse section; Fig. 3, a top plan view; Fig. 4, a view of two uncombined Chinese radicals; Fig. 5, a view showing the same radicals combined; Fig. 6, a view showing the position of several uncombined radicals, and Fig. 7, a view showing the position of the same radicals when combined.

Referring to the several views, particularly Figs. 1, 2 and 3, the numeral 5 indicates a cylinder mounted on a spline-shaft 6 journaled in suitable bearings in the sides 7, 7 of the frame. The cylinder 5 has a rotary and a longitudinal movement on its shaft, the rotary movement, in either direction, is accomplished by a hand-wheel 8. Arranged on the cylinder are four thousand, two hundred Chinese characters, including my thirteen hundred and twenty-seven radicals a few of which are shown, as will be hereinafter more fully described. The longitudinal movement of the cylinder is accomplished by a key 9, which comprises an inwardly-extending bar 10 provided with oppositely-extending shifting bars 11, 11, continuing in downwardly-inclined bars 12, 12 and terminating in hubs 13, 13 slidable on a shaft 14 fixed in the sides of the frame. The respective ends of the cylinder are provided with flanges 15, 15, against which the bars 11, 11, abut, so that a movement of the key 9, in a right or left direction, will slide the cylinder on the shaft 14 accordingly.

The numeral 16 indicates a second cylinder rotatably mounted on a shaft 17 journaled in suitable bearings in the sides of the frame, and is designed to be rotated synchronously with the cylinder 5, by means of a suitable gearing comprising a gear-wheel 18 mounted on one end of the shaft 6, a similar wheel 19 mounted on one end of the shaft 17, and an intermediate idler-pinion 20 mounted on a short stud 21, said pinion being in mesh with the wheels 18 and 19, so that by turning the hand-wheel 8, motion is imparted to the wheel 19, through the medium of the pinion 20, and thereby to the cylinder 16. The cylinder 16 is provided with radicals and characters similar to those on the cylinder 5, except that the characters and radicals on cylinder 16 will be arranged in reverse order, so that each line on cylinder 16 will register with each line on cylinder 5.

Centrally attached to the shaft 14 is a rod 22 having its free end pivotally-connected to one end of a short link 23 which, in turn, has its other end pivoted to a rod 24 slidable in guides 25, 25. A fulcrum rod 26 has one end resting upon the slidable rod 24, near its outer end, said rod 26 having its upper end pivotally connected to one end of a short link 27, the other end of said short link being pivotally connected to a rod 28, slidable in guides 29, 29. The free or inner end of the slidable rod 28 carries a printing hammer 30, and attached to the lower end of rod 26 is a retractile spring 31, capable of being tensioned by an adjusting screw 32, the purpose of the spring 31 being, in conjunction with spring 32' to return the rod 26, link 27, and slidable rod 28 to normal position after a character or a combination of radicals have been printed.

The numeral 33 indicates a spacer-bar having a key 33' at its upper end, and provided at its inner end with a crank-arm 34 mounted on a spindle or shaft 35, the crank-arm being pivotally connected to one end of a movable rod 36, the other end of said rod being connected to the lower arm of a pivoted two-arm lever 37. The other or upper arm of the two-arm lever is attached to one end of a coil-spring 38, the other end of said spring being attached to a standard 39 extending upwardly from the slidable rod 24, said spring serving to return the two-arm lever to its normal position after being rocked by the action of the spacer-bar. The spring 38 is provided intermediate of its length with a plate or bar 40, to which is attached an arm 41 depending from the paper-carriage 42, which carriage may be of any approved construction supported upon bearings 43, 43, and provided with any suitable escapement, such for instance as shown in the Hammond Patent No. 290,419, December 18, 1883. A fixed backing 44, having a central opening 45, being provided for the paper 46 which is fed between rubber rolls 46', 46', and guided to the printing-point by the guide 47 so as to allow but one letter being printed at a time. A suitable back-spacer key 48 is provided.

The front 49 of the frame of the machine, below the key 9, is provided with a number of holes 50, one for each transverse or circumferential row of characters, into which the pointer 51, depending from the key-bar 10, is adapted to enter when the key 9 is depressed, and thereby preserve proper transverse or up and down alinement.

The front 49 is provided with a longitudinal slot 52 through which the longitudinal rows of characters or radicals may be observed.

In the printing operation, the cylinder 5 is rotated, which in turn rotates the cylinder 16, through the medium of the idler 20, until the longitudinal row in which the character or radical to be printed is observed through the slot 52, the cylinder 5 will then be moved longitudinally until the transverse or circumferential row containing the character or radical is found. When this is done the character or radical will be in proper printing position, so that by striking key 9 the hammer will be caused to strike the character or radical to be impressed upon the paper.

To illustrate, take one of the radicals arranged on the cylinder 5, for instance the one indicated by $x$, which is at the left hand of the row, it will be seen that the corresponding radical on the cylinder 16 is at the right hand of the row. The cylinder 5 is rotated until the radical ($x$) is seen through the slot 52, the cylinder 5 is then moved longitudinally until the radical $x$ is in transverse line with the similar radical on the cylinder 16, these movements will bring the radical into printing position on the cylinder 5, and when the key 9 is struck the radical will be imprinted upon the paper, at the same time the detent 51 will enter the aperture 50, preserving the proper transverse alinement until the printing mechanism is tripped.

At opposite sides of the machine is a vertical shaft 53 journaled in suitable bearings, and mounted thereon is a ribbon-spool 54. The lower end of one shaft is provided with a gear-wheel 55 which meshes with a bevel-gear mounted on a shaft 56, which carries a ratchet wheel 57 adapted to be engaged by a pawl 58 fixed on the movable rod 36, whereby, when the spacer-key is depressed the ribbon is caused to be fed a single step.

A tripping-mechanism 59 59' of any well-known construction, such as shown in the aforementioned Hammond patent may be employed to trip.

Each Chinese word occupies a square position and if the word is composed of one character this character also occupies a similar square position and is written alone, and the term "character" as used in this application has the above meaning. If, however, the word is composed of more than one character the component parts of the word are known as "radicals", and each of these radicals must be of one-half or a lesser part of a square, in order that when combined with each other the resultant word will occupy the customary square position. The term "radical" as used in this application is to be understood as meaning a symbol which is used in combination with other symbols to make up a word. Instead of being used in combination, each one of these symbols or radicals may frequently be used alone, in which case they would be written to occupy a square position and according to the above definition would then be known as characters. The symbols shown in Fig. 8 are all radicals since they each occupy less than a square position, but upon the cylinders of the machine are also placed similar symbols but occupying a square position, which makes them characters. Fig. 4 is an enlarged representation of two radicals, one on the left, the other on the right. When these radicals are combined as shown in Fig. 5, they form a word meaning "forest". The entire word occupies a square position as explained above.

In Fig. 6 the position of some radicals are represented at the top and others at the bottom of the squares, each radical being indicated by the numerals 1, 2, 3, 4, 5 and 6. By combining these various radicals, as indicated in Fig. 7, the following words will be formed: I—meaning—bamboo; II—a kind of vegetable; III—universe; IV—musical instrument; V—wheat; VI—passed time; VII—measuring instrument; VIII—a name of place in Shantung, China, and IX—palace. Thus it will be seen that each word formed is the combination of but two radicals, and many thousand words may be formed. By my arrangement of separate radicals on the printing cylinder these radicals may be easily combined to form many other different words, which so far as I am aware, has never before been accomplished by any other apparatus known to me. To illustrate my method or system in English, I may take any number of words, for instance the three following words, viz: "expect", "submit", and "exist". By separating each of these words in radicals, and then by a series of combinations many different words may be formed, such as "expect", "exist", "exit", "submit", "suspect", "subsist", "sun", "bit", "mist", "it", "its", "reëxist", "insist", "respect", "remit", "sex", "sit" and others. My method and arrangement possesses great advantage, not only in Chinese, but in all languages in which the words are composed of radicals and not of letters, such for instance as Japanese and Korean.

It will be understood that various modifications or changes in the details of construction of my invention may be made without departing from the principle thereof.

Having fully described my invention what I claim as new and desire to secure by Letters-Patent, is:

1. A printing machine having in combination a pair of cylinders each having characters and radicals thereon, means for moving said cylinders in unison, and means for moving one of said cylinders independently of the other in order to bring the characters and radicals on this cylinder into printing position and means associated with the other cylinder for indicating when the characters and radicals are in printing position.

2. A printing machine having in combination a pair of rotatable cylinders each having characters and radicals thereon, means for moving one cylinder longitudinally with respect to the other cylinder, geared wheels associated with each cylinder and means connecting the said geared wheels whereby rotation may be imparted from one cylinder to the other.

3. A printing machine, having in combination a pair of rotatable cylinders each having a plurality of circumferential rows of characters and radicals thereon, means for moving one of said cylinders longitudinally, means for printing from the characters and radicals on said longitudinally movable cylinder, and means for rotating the cylinders in unison to bring the desired circumferential row of characters and radicals into printing position.

4. A printing machine having in combination a pair of rotatable cylinders each having a plurality of longitudinal rows of characters and radicals thereon, means for moving one of said cylinders longitudinally, means for printing from the characters and radicals on said longitudinally movable cylinder, and means for rotating the cylinders in unison to bring the desired longitudinal row of characters and radicals into printing position.

5. A printing machine, having in combination a pair of rotatable cylinders each having a plurality of circumferential rows and a plurality of longitudinal rows of characters and radicals thereon, means for moving one of said cylinders longitudinally, means for printing from the characters and radicals on said longitudinally movable cylinder, and means for rotating the cylinders in unison to bring the desired circumferential row and longitudinal row of characters and radicals into printing position.

6. A printing machine, having in combination upper and lower rotatable cylinders each having characters and radicals thereon, means for moving the upper cylinder longitudinally, apertures coöperating with said means for locking the upper cylinder in position with respect to the lower cylinder, and an observation slot whereby the position of said characters and radicals may be determined.

7. A printing machine, having in combination upper and lower rotatable cylinders each having characters and radicals thereon; shifting bars for moving the upper cylinder longitudinally, means for rotating the cylinders in unison, means for printing from said characters and radicals, and means for indicating when said characters and radicals are in printing position.

8. A printing machine, having in combination a pair of rotatable cylinders each having characters and radicals, means for moving one cylinder longitudinally with respect to the other cylinder, means for rotating said cylinders in unison, and means for printing from the characters and radicals on one of said cylinders.

9. A printing machine, having in combination a pair of rotatable cylinders each having characters and radicals, means for moving one of said cylinders longitudinally with respect to the other cylinder, means for rotating said cylinders in unison, means for printing from the characters and radicals on one of said cylinders, and means for indicating when the desired characters and radicals are in printing position.

10. A printing machine, having in combination a cylinder with printing characters and radicals thereon, means for bringing said characters and radicals into printing position, a slidable member, a printing head upon said slidable member, means for holding a sheet of paper between said cylinder and said printing head, a second slidable member, means for actuating said first slidable member from said second slidable member, and means for actuating said second slidable member.

In testimony whereof I affix my signature in presence of two witnesses.

HEUEN CHI.

Witnesses:
CHARLES E. J. KUNZ,
HERMAN E. FRANK.